US008647563B2

(12) United States Patent
Delette

(10) Patent No.: US 8,647,563 B2
(45) Date of Patent: Feb. 11, 2014

(54) PRESS TOOL

(75) Inventor: Gerard Delette, Grenoble (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 132 days.

(21) Appl. No.: 13/145,702

(22) PCT Filed: Jan. 19, 2010

(86) PCT No.: PCT/EP2010/050555
§ 371 (c)(1), (2), (4) Date: Aug. 8, 2011

(87) PCT Pub. No.: WO2010/084110
PCT Pub. Date: Jul. 29, 2010

(65) Prior Publication Data

US 2011/0280982 A1 Nov. 17, 2011

(30) Foreign Application Priority Data

Jan. 23, 2009 (FR) ..................................... 09 50407

(51) Int. Cl.
*B29C 43/50* (2006.01)

(52) U.S. Cl.
USPC ............ 419/38; 425/78; 425/193; 425/451.2; 425/451.7

(58) Field of Classification Search
USPC ............. 425/78, 193, 195, 330, 450.1, 451.2, 425/451.7, 468, 577, 589, 590; 419/38, 66
See application file for complete search history.

(56) References Cited

U.S. PATENT DOCUMENTS

| | | | | |
|---|---|---|---|---|
| 2,558,823 | A * | 7/1951 | Hossenlopp et al. | 425/352 |
| 2,942,298 | A * | 6/1960 | Loedding | 425/354 |
| 5,694,640 | A | 12/1997 | Greetham | |
| 7,381,046 | B2 * | 6/2008 | Kuo | 425/443 |
| 7,393,370 | B2 * | 7/2008 | Peterman et al. | 425/405.1 |
| 8,167,602 | B2 * | 5/2012 | Hartner | 425/193 |

FOREIGN PATENT DOCUMENTS

| | | | |
|---|---|---|---|
| EP | 1 602 473 | A1 | 12/2005 |
| SU | 454 133 | | 2/1975 |
| SU | 1 303 436 | A1 | 4/1987 |
| SU | 1 315 135 | A1 | 6/1987 |

OTHER PUBLICATIONS

International Search Report issued Apr. 16, 2010, in PCT/EP2010/050555.

B. P. Holownia, "Balanced die method for metal powder compaction", Powder Metallurgy, vol. 39, No. 3, XP-000641581, Jan. 1, 1996, pp. 207-209.

* cited by examiner

*Primary Examiner* — Richard Crispino
*Assistant Examiner* — Thukhanh Nguyen
(74) *Attorney, Agent, or Firm* — Oblon, Spivak, McClelland, Maier & Neustadt, L.L.P.

(57) ABSTRACT

When compressing a part, stress concentrations are prevented when it is removed from the mold by lowering an insert so as to release the top of a fine, flexible inner tube in such a way that it can expand in the location where the part will be removed from the mold, and can partially release the inner stresses in the part, in the area of the portion which has been removed from the mold.

4 Claims, 5 Drawing Sheets

PRESS TOOL

BACKGROUND OF THE INVENTION

1. Field of the Invention

The subject of the invention is press tool.

2. Discussion of the Background

The manufacture of mechanical parts by pressing of powders to give a compact blank, followed by fritting, can involve the use of uniaxial compression including a die consisting of a housing in which the powder is poured, and a punch which is engaged in the housing to produce the compression of the powder or, as a variant, a pair of punches which are engaged in two opposing ends of the housing in two opposite directions. These presses operate at relatively high rates. They have numerous applications: they can concern metal or ceramic mechanical parts such as gears, magnets, nuclear fuel pellets, etc.

This type of method does, however, have disadvantages. One of the most substantial appears when the compressed part is removed from the mould by gradually taking it out of the housing an axial push movement of the punch. The compression has produced radial stresses in the part, which are released as it is removed from the housing, producing a radial expansion. The risks of damage to the part by cracking or breaking are frequent in the orifice of the housing, between the portions which are still stressed and the portions which have suddenly been released, in which stress concentrations appear. Various methods have been used to improve the quality of the parts. One may mention the use of lubricating additives or binders in the powders, or the choice of particular compression sequences by the punches; but additives impair fritting since they are volatile and can be polluting, and the second methods reduce production rates substantially. These two groups of methods also remedy other faults to some degree, such as insufficient cohesion of the material after compression.

Other methods consist in giving the orifice of the housing of the die a bevel or a connection radius to prevent a sudden transition between the stressed state and released state for the part whilst it is being removed from the mould, but this method is effective only with well-determined orifice profiles which are specific to each variety of part, rendering it difficult to implement.

Still other methods consist in adding in the die tubes made of rubber or other flexible materials which facilitate removal from the mould and are then sacrificed, but this is also costly.

Finally, another type of method, described for example in document U.S. Pat. No. 7,128,547, consists in dividing the die into sectors which are assembled during the compression phase and then separated so as to release the residual compression stresses simultaneously for the entire part. Embodiments of such methods often do not include any means to retain the die sectors once the die has been untightened, making them unfit for automation. Others include a mechanism for controlling the movements of the sectors enabling the method to be automated, but they are complex, involving the use of actuators of the sectors, and they do not truly guarantee that the sectors are satisfactorily contiguous when the powder is poured, a necessary factor for satisfactory manufacture.

A variant of this design consists in tightening the die using springs, an external pressure or any other means to reduce its diameter during pressing; it is described in documents EP-A-1 602 473, U.S. Pat. No. 5,694,640 and in the article by Holownia "Balanced die method for metal powder compaction", published in Powder Metallurgy, vol. 39, n°3, Money Publishing. The tightening is stopped after the pressing, enabling the die to expand in order to reduce the extraction friction of the formed part, and thus facilitate mould-removal. The technical problem is slightly different, and these methods do not help improve the transition of the stresses when the die is removed between the portion removed from the mould and the portion still contained in the die. It should also be observed that, in these examples, the centripetal pressure is applied only to the centre of the die, whereas the edges are held rigidly in the device and therefore have no flexibility.

SUMMARY OF THE INVENTION

The invention has been designed to obviate these disadvantages and to allow automatic and reliable compression of parts at a high rate, whilst reducing the risks of damage on removal from the mould, and subsequent shape and dimension faults.

In a general form, the invention thus concerns a press tool including a die, an armature external to the die, a flexible tube forming a central housing in which part pressings are accomplished, and an insert, positioned between the flexible tube and the armature, and which is mobile when moved by a mechanism, characterised in that the insert slides over the tube and extends as far as one end of the tube, by which the pressed parts are extracted from the housing, and in that the insert releases the said end, which is separated from the armature by a gap, in another position.

The effect of this arrangement is that it enables the tube to bend when it expands near the mould-removal orifice, and thus yield partially to the part's inner compression stresses. These inner stresses are partially released before the mould-removal, as the mould-removal orifice is approached, such that the transition between the removed parts and the parts still present in the housing is greatly attenuated when the part is removed, and such that the stress concentrations traditionally observed at the junction between these two states of the part are extremely reduced or have even disappeared.

A flexible tube is superior to a bevel or a traditional rounding at the top of the housing, since it bends in response to the distribution of the inner stresses in the mould-removal direction, and in that it therefore adopts, by itself, a profile enabling the stress concentrations to be greatly reduced. And it makes for a die of simpler design than segmented dies, where there is no risk that the housing will not close satisfactorily.

In a preferred embodiment of the invention the tube is joined to the armature by a skirt at one end of the armature opposite the extraction position, the armature encompasses a recess partially formed by the skirt, and the insert includes a moving protruberance in the recess between stop states on facing walls of the recess.

BRIEF DESCRIPTION OF THE DRAWINGS

The invention will now be described with reference to the following figures.

DETAILED DESCRIPTION OF THE PREFERRED EMBODIMENTS

Figure 1:
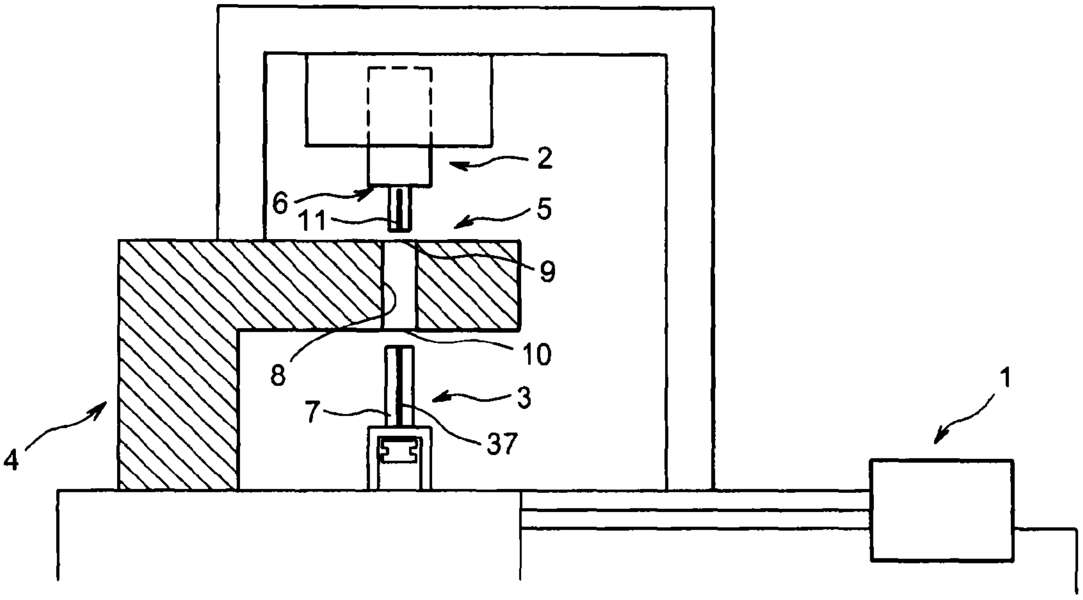
FIG. 1 PRIOR ART
FIG. 1 illustrates a press fitted with a tool.

FIG. 1 represents a press including a control system 1, an upper punch 2, a lower punch 3 and a tool 4 specific to the invention which includes a die 5. The upper punch 2 and the lower punch 3 include rods 6 and 7 which are pointing towards one another. The die 5 includes a housing 8 aligned with rods 6 and 7 which can penetrate into it between facing orifices 9 and 10. The lower piston 3 and its rod 7 include a needle 37 which slides in it, and the rod 6 of the upper piston 2 includes a housing 11 opposite the needle 37, which can penetrate into it. This arrangement enables hollow parts of annular shape to be compressed. The invention is not limited to this situation and also concerns presses without needles, and possibly with a single punch; the housing would then be fitted with a single orifice and would include a base on the other side. The control system 1 controls the movements of the punches 2 and 3 and of the needle 37.

Figure 2:
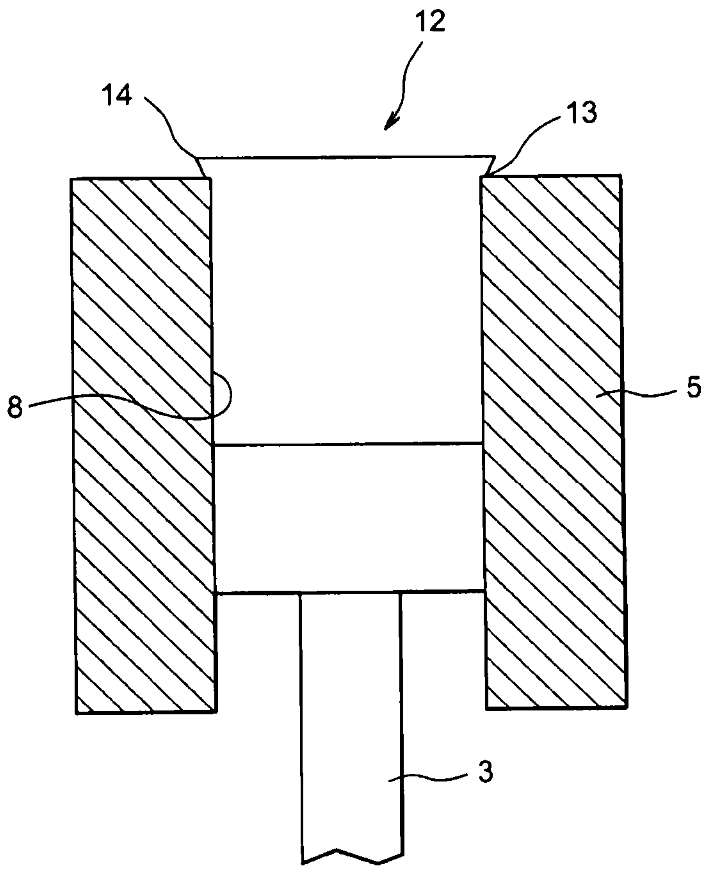
FIG. 2 PRIOR ART
FIG. 2 illustrates the phenomenon which is found.

The problem experienced in the course of mould-removal is illustrated in FIG. 2, if the lower piston 3 undertakes the mould-removal, where the part is referenced 12. As the part moves past the orifice 13 of the housing 8, the release of the inner stresses in the radial direction produces a corner-shaped expansion 14, which causes substantial stress concentrations, and which the invention seeks to prevent.

Figure 3:
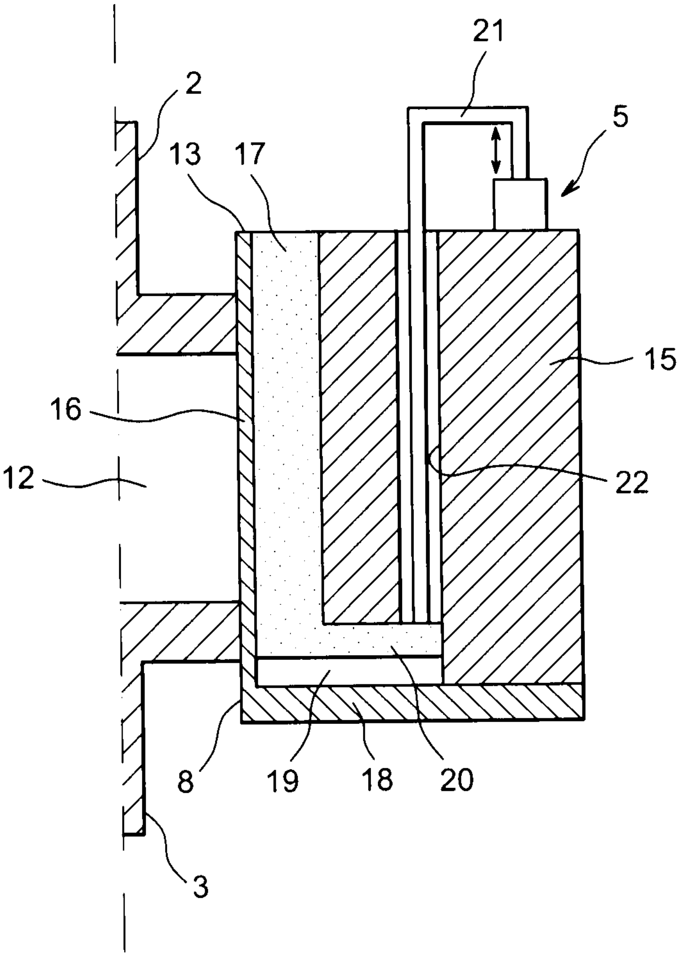
FIG. 3 illustrates the die.

Reference should be made to FIG. 3. The die 5 consists of an armature 15 which is a principal portion of it, a flexible tube 16 surrounded by the armature 15 with a gap, and which forms the housing 8, and a cylindrical-shaped insert 17, which is introduced between the previous two elements with a sliding adjustment movement. The tube 16 is joined to the armature 15 by a lower skirt 18 (on the side of the lower punch 3), which forms a recess 19 with the armature 15. The insert 17 includes a radial protruberance 20 which is present in the recess 19, in which it can move in a vertical direction until stops against surfaces facing the recess 19. A control mechanism 21 controls the insert 17, enabling it to move vertically between the two stop positions mentioned above. This can be a rod entering into a passage 22 of the armature 15, and attached to the protruberance 20. The rod is controlled by a means such as a jack connected to the armature 15.

Figure 4:
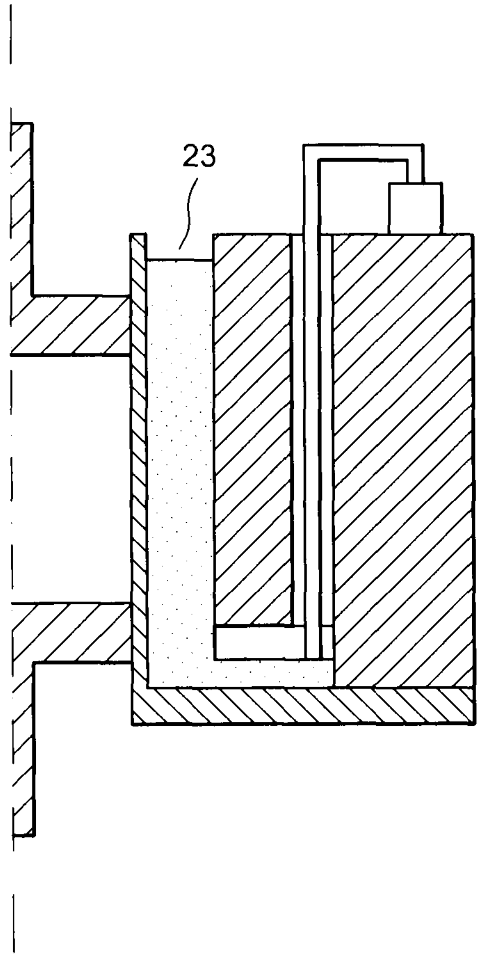
FIG. 4 illustrates another state of the die.
Figure 5:
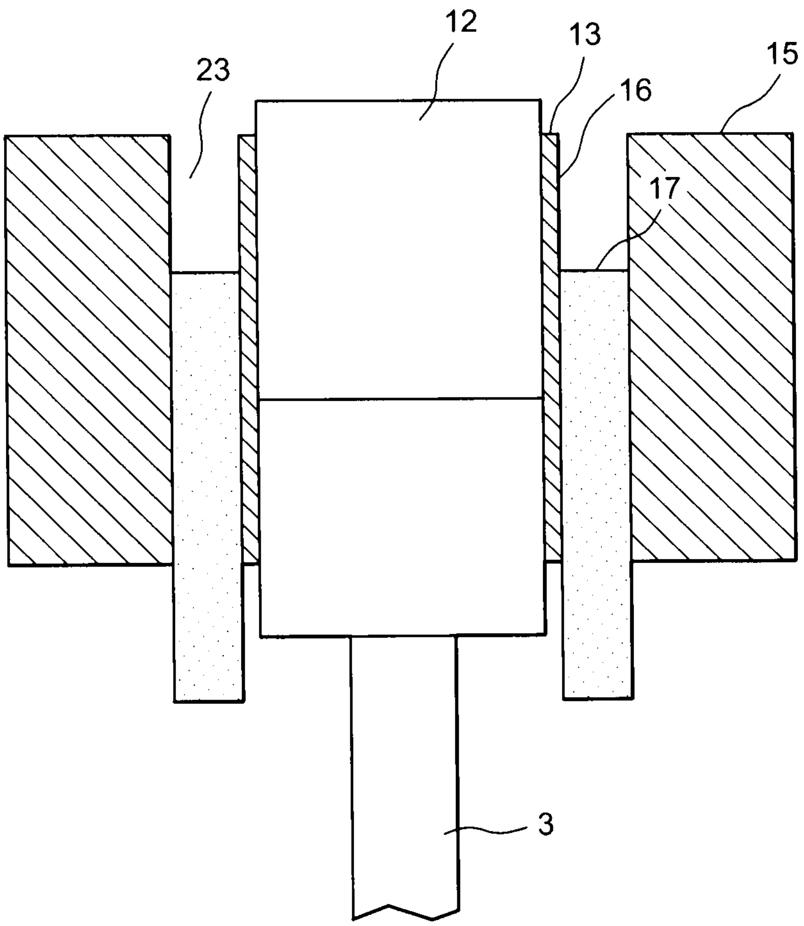
FIG. 5 illustrates the mould-removal process.

During most of the manufacturing process the state is that of FIG. 3, in which the insert is raised until and becomes level with the tube 16, making it flush with the orifice 13 of the housing, and where the protruberance 20 comes to a stop against the upper face of the recess 19. And when mould-removal is begun the insert 17 is lowered until it comes to a stop against the lower face of the recess 19. This state is represented in FIG. 4. A gap 23 appears between the top of the tube and the armature 15. During mould-removal, which is illustrated in FIG. 5, the top of the tube 16, which is positioned before the gap 23, is able to expand when the part 12 becomes level with it, and is then subject to mould-removal, reducing the stress concentrations in the orifice 13 of the housing 8.

An essential property of the tube 16 is that it must be sufficiently flexible to be able to expand, and this flexibility is determined by its thickness. It must therefore be fine, for example having a thickness of between 0.5 and 1 mm if it is made from tungsten carbide, which has satisfactory resistance to wear and tear. The insert 17 is normally thicker, but its dimensions are not critical, and it may consist of a steel tube 2 to 10 mm thick. Finally, the armature 15 can have the shape of a cylindrical sleeve 10 to 15 mm thick, also made from steel.

According to a development of the invention, during operation, the insert may be completely taken out of contact with the tube, so as to eliminate the friction forces during mould-removal. A sufficiently large sliding area should then be provided to release these two elements from one another.

The invention claimed is:

1. A press tool including a die, the die including:

an outer armature;

a flexible tube forming a central housing in which parts are pressed;

an insert, positioned between the tube and the armature, the insert being slidable over the tube;

wherein the tube is joined to the armature by a skirt at an end of the tube, and separated from the armature at an opposite end of the tube at which the parts are removed after having been pressed;

and the insert is slidable between a first position at which it is flush with said opposite end of the tube and a second position at which a gap is present between the tube and the armature at said opposite end.

2. The press tool according to claim 1, wherein the insert comprises a protuberance, and the die comprises opposite stop faces for limiting sliding movements of the insert over the tube.

3. The press tool according to claim 1, wherein the insert is cylindrical and in sliding adjustment movement with the tube.

4. A process for pressing parts in a die, said process comprising pressing the parts by at least one punch penetrating into a tube of the die containing the parts, then removing said parts out of an orifice of the tube, and sliding the tube, said tube being flexible, a cylindrical-shaped insert surrounding the tube and in sliding adjustment movement therewith, wherein the orifice is released after the parts are pressed and before the parts are removed, and the tube radially expands at said orifice when the parts are removed.

* * * * *